United States Patent [19]

Carden, Jr. et al.

[11] 4,274,965
[45] Jun. 23, 1981

[54] LACTAM TERPOLYMER MEMBRANES

[75] Inventors: Joseph A. Carden, Jr., Durham; Ray McKinney, Jr., Raleigh, both of N.C.

[73] Assignee: Monsanto Company, St. Louis, Mo.

[21] Appl. No.: 52,381

[22] Filed: Jun. 27, 1979

Related U.S. Application Data

[62] Division of Ser. No. 913,175, Jun. 6, 1978, Pat. No. 4,181,606.

[51] Int. Cl.³ .................. B01D 13/00; B01D 31/00
[52] U.S. Cl. .......................... 210/500.2; 210/321.3; 428/220; 428/376; 428/398; 428/401
[58] Field of Search ............... 210/500 N; 428/220, 428/376, 398, 401

[56] References Cited

U.S. PATENT DOCUMENTS

| | | |
|---|---|---|
| 3,781,378 | 12/1973 | Kantor et al. |
| 3,944,629 | 3/1976 | Hedrick et al. |
| 3,993,709 | 11/1976 | Hedrick et al. |
| 4,031,164 | 6/1977 | Hedrick et al. |
| 4,034,015 | 7/1977 | Hedrick et al. |
| 4,069,151 | 1/1978 | Higley et al. ............... 128/214 R |
| 4,075,108 | 2/1978 | Higley et al. ............... 210/500 M |
| 4,181,606 | 1/1980 | Carden et al. ............... 210/500 M |

*Primary Examiner*—James C. Cannon
*Attorney, Agent, or Firm*—Thomas B. Leslie; James W. Williams, Jr.

[57] ABSTRACT

Permselective membranes are provided consisting of lactam-polyol-polyacyl lactam block terpolymers having from 35 to 75% by weight polylactam blocks and 25 to 65% by weight polyalkylene ether blocks. The membranes are particularly suitable as blood dialysis membranes having improved permeability to solutes in the medium range of molecular weights while maintaining acceptable ultrafiltration rates and permeability to low molecular weight solutes. The membranes are provided both as planar films and hollow fibers, have high hydrolytic stability under hot wet sterilization conditions and good mechanical properties under hemodialysis conditions.

17 Claims, No Drawings

LACTAM TERPOLYMER MEMBRANES

This is a division of application Ser. No. 913,175, filed June 6, 1978, now U.S. Pat. No. 4,181,606, issued Jan. 1, 1980.

This invention relates to new lactam terpolymer permselective membranes, and particularly to such membranes which are especially useful for hemodialysis.

At the present time most hemodialysis membranes for use in artifical kidneys are generally made of cellulosic or other hydrophilic materials. Among the best of these materials currently available for such purpose is believed to be a cellulose regenerated from a cuprammonium solution and marketed as "Cuprophane" membranes. Even though Cuprophane membranes provide ultrafiltration rates and clearances of low molecular solutes within the desirable ranges for proper hemodialysis they still suffer from many disadvantages which render them not totally satisfactory for use in the various artificial kidney devices for the dialysis of human blood. Some uremic toxins believed to require removal from blood during hemodialysis have been tentatively identified as medium molecular weight compounds, i.e. compounds having molecular weights in the range of 300 to 5,000. Cuprophane membranes do not demonstrate sufficiently high permeabilities to the molecules of such medium molecular weight to enable their clearance from dialyzed blood in reasonably short periods of time. Several recent medical researchers have reported a condition termed "the uremic syndrome" which has been attributed to the accumulation of the unidentified, medium molecular weight toxins of approximately 300 to 1500 molecular weight in the blood of patients undergoing hemodialysis. Thus, novel membranes demonstrating a greater permeability to such medium molecular weight molecules are highly desired.

Cuprophane membranes also suffer from other disadvantages including a lower burst and tear strength than is desired in membranes used in hemodialysis equipment. Furthermore their shelf-life is relatively short, possibly due to the migration of the glycerol plasticizer present in Cuprophane membranes. Many of the above disadvantages could be overcome if a suitable block polymer were available consisting of segments of relatively hydrophilic polymer within a matrix of segments of relatively hydrophobic polymer which can contribute to the mechanical integrity of the block copolymers and terpolymers in the presence of water and other solvents which affect the hydrophilic polymer segments. Certain researchers have proposed the preparation of membranes suitable for contact with human blood from block copolymers of polycarbonates with certain hydrophilic polymer blocks or segments. For example, Kantor et al in U.S. Pat. No. 3,781,378 have proposed the employment of a polydiorganosiloxane-polycarbonate block copolymer as suitable for fabricating human blood compatible membranes which are gas permeable, e.g. permeable to oxygen for the purpose of oxygenating withdrawn blood.

There has also been proposed by Higley et al the fabrication of blood dialysis membranes from block polyetherpolycarbonate block copolymer such as they have described in U.S. Pat. No. 4,069,151 and No. 4,075,108. However, these polyetherpolycarbonate block copolymer membranes have likewise not proved to be wholly satisfactory for use in hemodialysis. Certain of the membranes formed from such block copolymers suffer from lack of sufficient mechanical strength or integrity in the presence of water or other solvents for the hydrophilic segments due to the randomnicity of the copolymer formed. Furthermore the membranes are required to possess an anisotropic or "skinned" very thin surface which is difficult to fabricate requiring a wet-phase inversion and aqueous coagulation technique which require extremely careful control in order to realize membranes acceptable for use in blood hemodialysis. Therefore there is a need for hemodialysis membranes prepared from novel hydrophobic and hydrophilic block copolymer and terpolymer compositions which are not subject to some of the disadvantages of the membranes of the prior art.

Therefore it would be advantageous if there were provided hemodialysis membranes having improved permeability to solutes in the medium range of molecular weight as compared to presently available dialysis membranes, while at the same time demonstrating maintained or improved permeability to low molecular weight solutes but not evidencing excessive ultrafiltration rates for aqueous solvents. Advantages are also realized when such hemodialysis membranes are available in the form of both thin planar films and hollow fibers. Other advantages accrue when such hemodialysis membranes have high hydrolytic stability under hot and wet sterilization conditions and as well have good mechanical properties of strength and modulus under the conditions of use in hemodialysis treatment.

In accordance with the present invention there are provided sterilizable permselective membranes comprising a lactam-polyol-polyacyl lactam block terpolymer having 35 to 75% by weight polylactam blocks and 25 to 65% by weight polyalkylene ether blocks. More specifically, the present invention comprises providing a sterilizable blood dialysis membrane in the form of either a planar film or a hollow fiber comprising a lactam-polyol-polyacyl lactam block terpolymer having from about 35 to about 75% by weight poly-epsilon-caprolactam blocks and from about 25 to about 65% by weight of polyalkylene ether blocks.

It has been found that the permselective membrane produced from the above terpolymers demonstrate a high level of compatibility with human blood and suitability for use in blood dialysis. It has also been found that blood dialysis membranes fabricated from the above terpolymers are considerably superior to Cuprophane membranes and other cellulosic and non-cellulosic membranes proposed for blood dialysis in their permeabilities to solutes in the medium molecular weight range as well as at least comparable to such other membranes in the permeabilities of low molecular weight solutes and of somewhat lower and improved ultrafiltration rates. Furthermore it has been found that blood dialysis membranes fabricated from the above terpolmers demonstrate superior hydrolytic stability towards sterilization by either boiling water or steam and maintain their integrity during such treatment. Moreover it has also been found that the blood dialysis membranes fabricated from the above terpolymers demonstrate superior strength and mechanical properties under the conditions of blood dialysis treatment.

The lactam-polyol-polyacyl lactam block terpolymers from which the novel hemodialysis membranes of the present invention are fabricated are lactam-polyol-polyacyl lactam block terpolymers containing from about 25 wt. % to about 65 wt. % of polyalkylene ether blocks present as the polyol segments of said terpolymers. It has been found that within these proportions of polyether blocks normally hydrophobic polylactam terpolymers are rendered sufficiently hydrophilic as to make them suitable for use for fabrication of hemodialysis membranes. The block terpolymers found specifically useful in the present invention and the processes for preparing such block copolymers are fully described in the following U.S. patents of Ross M. Hedrick and James D. Gabbert; U.S. Pat. Nos. 4,031,164 issued June 21, 1977, 4,034,015 issued July 5, 1977, 3,993,709 issued Nov. 23, 1976 and 3,944,629 issued Mar. 16, 1976, all of which are incorporated herein by reference.

The terpolymers described and claimed in the above referenced patents are basically of three types. They include lactam-polyol-polyacyl lactam terpolymers having both ester and amide linkages between the various segments or blocks, terminated with amide groups and derived from the anionic polymerization of at least one lactam with a polyol and a polyacyl lactam, generally a bis- or trispolycarbonyl lactam. Terpolymers of this type which are specifically useful in the present invention include those derived from epsilon-caprolactam polymerized under the disclosed conditions with a polyalkylene glycol and an alkylene or phenylene carbonyl biscaprolactam as fully described in U.S. Pat. No. 4,031,164.

Terpolymers of the second type as exemplified in U.S. Pat. No. 4,034,015, are essentially the same as those described in the first reference except such terpolymers possess from 5 to 100% ester terminal groups derived from reacting the same three reactants as above with additionally a monohydric aliphatic alcohol. As in the first type of terpolymer described those terpolymers which have been found specifically useful in the present invention are those derived from epsilon-caprolactam copolymerized by anhydrous, base-catalyzed anionic polymerization with a polyalkylene glycol, an alkylene or phenylene biscaprolactam and a monohydric functional aliphatic alcohol. In preparing both types of terpolymers described above, the anhydrous, base-catalyzed anionic polymerizations are carried out in the presence of any of the well-known basic lactam polymerization catalysts.

The third variation of the above terpolymers, whose structure and preparation are described in U.S. Pat. Nos. 3,944,629 and 3,993,709, are those having both ester linkages and amide linkages between the segments or blocks and entirely ester terminal groups which are prepared by initiating the anionic polymerization of the lactam with a polyether-polyester prepolymer formed from dialkyl dicarboxylic acid esters and polyether polyols. The formation of the polyether-polyester prepolymer is accomplished by esterification of the polyether polyol with dicarboxylic acid esters in the presence of typical transesterification catalysts. The terpolymers of this latter type specifically preferred in the present invention are those prepared from epsilon-caprolactam, polyalkylene glycols and lower dialkyl aliphatic or aromatic dicarboxylic acids.

The polyols suitable for the formation of the terpolymers useful in the present invention are polyether glycols or polyalkylene glycols. Among the most useful of such polyether glycols are polyethylene glycol, polypropylene glycol, polybutylene glycol and polypropylene oxide-polyethylene oxide block copolymers such as those exemplified by the Pluronic series of diols.

Polyacyl lactams useful in the formation of the first two types of terpolymers described above are alkylene or arylene polyacyl lactams. The preferred polyacyl lactams for use in the present invention are the alkylene or phenylene carbonyl bis-caprolactams such as terephthaloyl bis-caprolactam, isophthaloyl bis-caprolactam, adipoyl bis-caprolactam, maloyl bis-caprolactam, succinoyl bis-caprolactam, glutaroyl bis-caprolactam, sebacoyl bis-caprolactam and the like. The most preferred among the above bis-lactams are terephthaloyl bis-caprolactam, isophthaloyl bis-caprolactam and adipoyl bis-caprolactam.

Mono-functional alcohols employed in the production of the second type of terpolymer described above can be any mono-functional aliphatic end-substituted alcohol. Those preferred for use in producing the terpolymers of the present invention include such alcohols as methanol, ethanol, 1-propanol, 2-propanol, 1-butanol, 1-hexanol, 2-octanol, 1-decanol, 1-dodecanol, 1-octadecanol. The most preferred mono-hydric alcohols are 1-butanol, 1-hexanol, 1-octanol, 1-decanol, and 1-dodecanol, i.e. an end-terminated monohydric aliphatic alcohol of from 4 to 12 carbon atoms. The dialkyl dicarboxylic acid esters employed in the production of the third type of terpolymer described above can be any dialkyl dicarboxylic acid esters which will undergo transesterification with the polyalkylene glycols employed. Among the preferred dialkyl esters are the lower dialkyl aryloates or alkanoates such as dimethyl terephthalate, dimethyl isophthalate, diethyl sebacate, dimethyl adipate, diethyl oxalate and the like. The most preferred such ester for ease of transesterification is the widely available dimethyl terephthalate.

Preparation of the lactam-polyol-polyacyl lactam block terpolymers is generally carried out while the polyol and polyacyl lactam reactants are in solution in molten caprolactam to which has been added a basic anionic lactam polymerization catalyst and subjecting the mixture to conditions which would cause the lactam to polymerize. In the alternative for the production of the second type of ester-terminated terpolymer the monohydric alcohol can likewise be present during the polymerization of the lactam. Moreover, certain desirable additives such as stabilizing agents and antioxidants are also present in the polymerizing mixture. Polymerization temperatures can vary from the melting poing of the lactam up to the melting point of the polymer produced and can encompass a range of from 70° to 230° C. The preferred polymerization temperatures are from about 90° C. to 190° C., more preferably from about 120° to about 180° C. for the caprolactam terpolymers of the present invention. Most preferred is the polymerization where the temperatures are increased during the polymerization from an initial temperature of from about 70° to 100° C. in the beginning to a final temperature of about 150° to 180° C.

For preparation of the third type of block terpolymer described above the initial transesterification of the polyether glycol with the dialkyl dicarboxylic acid ester is preferably carried out in solution in the epsilon-caprolactam monomer but prior to the addition of the basic lactam anionic polymerization catalyst. It is likewise preferred that the transesterification catalyst employed be one which does not function as a lactam anionic polymerization catalyst. Thus, it is preferred that a transesterification catalyst other than the alkali or alkaline earth metals, oxides and hydroxides and other than the Grignard organometallic catalysts be employed for the transesterification reaction. The amounts of transesterification catalysts employed will generally vary from about 0.005 to 0.6% by weight, and preferably from about 0.01 to 0.2% by weight based upon the quantity of dialkyl dicarboxylic acid prepolymer. The amounts of anionic lactam polymerization catalyst used can range from a fraction of 1 mol. % to 15 or 20 mol. % of the lactam monomer charged. Total polymerization times for complete polymerization of the desired block terpolymers will vary depending upon the temperatures and specific ingredients used in the polymerization system. Most such times will range from a few minutes to several hours and most preferably from about 30 minutes to 4 hours.

The amounts of the polyacyl bis-caprolactam used in the production of polymers of the first two types described above and of the dialkyl dicarboxylic acid esters in the preparation of the third type block terpolymer described depend upon the quantities of the caprolactam and polyalkylene glycols being employed. In order to produce the desired block terpolymers useful in the present invention it is preferred to employ at least an equivalent amount of each of such reactants with the hydroxyl groups present in the polyalkylene glycols used, and preferably a stoichiometric excess of from 5 to 100 mole % based upon the polyalkylene glycols present.

The molecular weights of the block terpolymers can vary widely from a number average molecular weight of from about 10,000 to about 400,000. For the block terpolymers specifically preferred in the present invention the number average molecular weight will range from about 20,000 to about 50,000. The molecular weight of the fully polymerized block terpolymers and the molecular weights of the various polylactam and polyol blocks making up the terpolymer can be widely varied depending upon the selection of the relative amounts of the reactants employed and the molecular weights of the polyalkylene glycols utilized as starting materials.

The molecular weights of the respective blocks or segments within the block terpolymers can likewise be widely varied as described in the above-cited patents. However for the block terpolymers specifically preferred for use in the present invention the polyol blocks generally have a number average molecular weight of from about 500 to about 10,000 and more preferably from about 1,000 to about 8,000 number average molecular weight. Likewise, in order to afford a sufficiently crystalline and mechanically strong block terpolymer the lactam blocks present will usually range from a number average molecular weight of at least 500, preferably at least 1,000 and most preferably from about 1,000 to 4,000 number average molecular weight.

The provision of the sterilizable permselective membranes of the present invention in the form of planar film membranes can be accomplished by several different methods. In one such method the polymers produced as described above can be moulded in a heated hydraulic press employing non-reactive and non-stick moulding surfaces such as Teflon coated surfaces using temperatures approximating the melting point of the terpolymers and high moulding pressures exceeding 2,000 kgs/cm$^2$. In such cases the moulded membranes upon cooling, will usually be separated from the moulds without damage to the membrane.

Suitable membranes can also be solvent cast upon smooth surfaces, preferably easily releasable, non-stick surfaces, from casting solutions in an organic solvent for the block terpolymer. The casting solutions are generally formulated to have a total solids content of from about 5 to about 30% by weight and preferably from about 10 to about 25% by weight.

A preferred organic solvent is trifluoroethanol, but many other organic solvents are suitable including formic acid, m-cresol and zinc or calcium chloride in methanol, as well as those requiring elevated solution temperatures such as butyro-lactone, dimethylformamide, ethylene glycol, dimethyl sulfoxide and dimethyl sulfone.

The thus cast membranes can be dried in air or in an oven under mild temperature conditions and thereafter freed from the supporting surface. The latter step is frequently aided by employing a water wash to float the finished membranes free of the supporting surface.

The permselective terpolymer membranes of the present invention can also be produced on a continuous basic by depositing casting solution as described by means of a doctor blade onto a moving smooth surfaced support and adjusting the doctor blade to produce a final dried membrane thickness of about 50 microns (2.0 mils) or less. If desired, the permselective terpolymer membranes of the present invention can be partially dried and then coagulated by the use of a non-solvent for the terpolymer such as water or an organic non-solvent, but such procedures have not been found necessary to produce permselective terpolymer membranes fully suitable for use in the manner of the present invention.

Permselective membranes of the present invention can also be provided in the form of hollow fibers produced by melt spinning fully polymerized terpolymers. The spinning is carried out by means of a tube-in-orifice spinnerette adapted to produce hollow fibers and in which the interior tube is supplied with air or an inert gas under sufficient pressure to prevent collapse of the forming filaments. The continuously melt spun filaments are quenched in heated or ambient air or in water or other non-solvent for the terpolymer as desired, and taken up on bobbins or the like in known manner.

The membranes of the present invention are useful in presently available dialysis apparatus as well as in other like apparatus still in experimental stages of development. Thus, planar film membranes composed of the desired terpolymers can be employed in dialysis apparatus of the kiil plate-and-frame type, and other parallel plate apparatus, marketed by Gambro and Travenol Laboratories, Inc. (PARA-FLO) such as of the Kolff tubular coil type, such as marketed by Extracorporeal Medical Specialties, Inc., and Travenol Laboratories, Inc. (Ultra-Flo and Twin Coil) and of the flat membrane envelope disposable type, such as the Ross-Muir dialyzer as well as others. Membranes for use in these apparatus are preferably from about 10 to about 100 microns and more in thickness, more preferably from about 20 to about 50 microns in thickness. Hollow fiber membranes composed of the described terpolymers are suitable for use in dialysis apparatus of the hollow fiber cartridge type such as the Cordis-Dow and Cobe dialyzers, the Travenol capillary flow dialyzer, and others which employ hollow fiber membranes. Hollow fiber membranes for use in these apparatus are preferably produced with wall thicknesses of from about 15 to 200 microns, more preferably from about 20 to 100 microns, and internal diameters of from about 50 to 300 microns, more preferably from about 100 to 200 microns. Hollow fibers of greater thickness and larger sizes can also be used in blood dialysis and have other uses as perm-selective membranes including concentration of high molecular weight solutions and removal of salts from biological solutions.

The following examples are supplied for the purpose of illustrating the present invention. The manner of preparation of the various terpolymers reported will be set forth in connection with the specific examples.

EXAMPLE 1

A—Terpolymer Preparation

A series of polylactam-polyol-polyacyl lactam block terpolymers were prepared using the general method of preparation outlined above. For these terpolymers there was used ε-caprolactam monomer, either terephthaloyl bis-caprolactam or isophthaloyl bis-caprolactam and a polyethylene glycol, the molecular weight of which was varied from about 1000 to 7500, or a polyethylene oxide-polypropylene oxide block copolymer (Pluronic P-75) of approximately 4100 mol. weight. In the instance of the use of Carbowax 6000 (of approximately 7500 mol. wt.) there was also present during the polymerization reaction an amount of decyl alcohol determined on the basis of the excess imide groups present to provide 75% ester terminal groups to the completed polymer. All the other samples were solely amide group terminated. The polymerizations were carried out by charging and mixing ε-caprolactam, the polyethylene glycol, terephthaloyl or isophthaloyl bis-caprolactam and approximately 0.5% by weight of an antioxidant, 4,4'-butylidene bis (6-tert. butyl-m-cresol) at a temperature of about 100° C. in a polymerization vessel. There was then charged approximately 12 weight % of an anionic lactam polymerization catalyst, a 0.4 molar solution of bromo magnesium caprolactam in caprolactam, and the mixture immediately cast into a preheated mold at 100° C. The mold was heated to 160° C. for approximately 30 minutes, cooled and the block terpolymer removed. The thus-prepared block terpolymer was melt extruded into uniform pellets before further working or shaping to afford a standardized form.

B—Membrane Formation

Flat membranes of the above series of terpolymers were formed by hot pressing pellets of each terpolymer in a heated hydraulic press using moulds of Teflon coated stainless steel plates. Thickness of the pressed membrane samples was established by use of 25.4μ (1 mil) brass shim stock spacers. The mould was heated to 235° C. and the pressure increased to an ultimate pressure of 2380 kg/cm² (34,000 psig). The moulds were then quenched in ambient temperature water and the membrane films allowed to float free of the coated surfaces. The membrane samples were removed from the water, dried and subjected to testing of their dialysis transport properties.

C—Transport Properties

The pressed membranes formed as described above were tested for transport properties in a modified 47 mm. Millipore cell. Each was first subjected to a integrity test by circulating at a pressure of 0.7 kg/cm² against one face an aqueous solution of a blue polymeric dye of molecular weight of approximately 2 million (Blue Dextran 2000). Any membrane in which the presence of the dye was detected in the supporting filter was judged to have a defect and was not tested further. The defect free membranes were next tested for ultrafiltration rate or membrane flux, which is the amount of test material, in this case water, which will pass through a given area of the membrane in a given period. This test was made for water flux under a pressure differential of approximately 0.25 kg/cm² (3.5 psi), and reported on basis of 10 mm Hg.ΔP. Thereafter, 0.05 molar solutions of sodium chloride, urea, creatinine and sucrose respectively in physiological saline were employed to determine the flux rates for each solute. All tests were conducted at 37° C. using physiological saline as dialyzate and samples were collected for periods of 90 minutes. Finally a water solution of 5000 ppm of a dextran, Dextran T-70, with a number average molecular weight of approximately 70,000, was tested to determine the rejection for a solution of predominantly large molecules. The results of the transport tests are set out in Table I below.

TABLE I

| | | | Transport Properties | | | | | |
|---|---|---|---|---|---|---|---|---|
| Samples | Terpolymer Composition | Wet Membrane Thickness $\times 10^2$(cm) | Flux (g/cm²-sec)[a] | | | | | Retention of Dextran T-70 |
| | | | Water | NaCl(58) | Urea(60) | Creatine(113) | Sucrose(342) | |
| A | 30% PEG 1000 | 9.4 | $7.28 \times 10^{-8}$ | $6.49 \times 10^{-7}$ | $1.30 \times 10^{-7}$ | $6.49 \times 10^{-6}$ | n.d.[c] | 95.1 |
| B | 30% PEG 3000 | 2.3 | $1.51 \times 10^{-5}$ | $7.46 \times 10^{-4}$ | $4.84 \times 10^{-6}$ | $1.74 \times 10^{-5}$ | $1.10 \times 10^{-5}$ | 92 |
| C | 30% CARBOWAX 6000 | 2.2 | $5.35 \times 10^{-7}$ | $2.47 \times 10^{-6}$ | $1.54 \times 10^{-7}$ | $1.23 \times 10^{-7}$ | n.d. | 92 |
| D | 30% Pluronic P-75 | 4.3 | $3.82 \times 10^{-7}$ | $3.79 \times 10^{-5}$ | $1.18 \times 10^{-6}$ | $3.50 \times 10^{-5}$ | $5.57 \times 10^{-5}$ | 85 |
| E | 45% Pluronic P-75 | 3.8 | $9.88 \times 10^{-8}$ | $4.15 \times 10^{-6}$ | $2.59 \times 10^{-7}$ | $5.71 \times 10^{-7}$ | n.d. | 88 |
| F | 50% PEG 3000 | 5.5 | $1.89 \times 10^{-8}$ | $6.12 \times 10^{-6}$ | $1.53 \times 10^{-6}$ | $1.53 \times 10^{-7}$ | n.d. | 96 |
| G | 50% CARBOWAX 6000 | 1.8 | $9.17 \times 10^{-8}$ | $3.07 \times 10^{-6}$ | $1.34 \times 10^{-6}$ | $1.54 \times 10^{-5}$ | n.d. | 96 |
| H | Cuprophane PT-150 | 0.28 | $9.88 \times 10^{-7}$ | $3.09 \times 10^{-7}$ | $3.85 \times 10^{-8}$ | $7.33 \times 10^{-8}$ | n.d. | 93 |

[a]Membrane flux values taken at aΔC of 0.05 M for each solute at 37 ± 0.05° C. and normalized to a membrane thickness of 25.4 μ. Sample collection period was 90 minutes.
[b]AΔP of 10 mm Hg was used in evaluating the water flux, the dimensions of which are g/cm²-sec. mm Hg.).
[c]n.d. indicates a level too low for detection.

EXAMPLE II

A. Membrane Formation

A terpolymer prepared by the same polymerization procedure as in Example I containing 30% by weight of a polyethylene glycol of approximately 2000 mol. wt. was extracted by soaking in ambient temperature water for 48 hours. It was melt spun into a hollow fiber at a temperature of about 250° C. employing a tube-in-orifice spinneret with nitrogen supplied to the bore of the extruded filament quenched in air and taken up at about 14 cm/sec. The terpolymer fiber produced had an outside diameter of 462 microns, and inside diameter of 185 microns and a wall thickness of 138 microns.

B. Transport Properties

A sample of 84 of the above hollow fibers each with approximately 22.5 cm of exposed length were assembled into a bundle, looped and the ends potted in an epoxy seal to form a tube sheet with the bores of the fibers open. The looped bundle was suspended in a sealed stirred dialysis cell containing water dialyzate and test solute solutions were passed through the fiber bores. A total fiber dialysis surface area of 111.5 cm$^2$ was subjected to dialysis in the tests which were conducted at 37° C. The water flux was determined under a pressure of 0.7 kg/cm$^2$ (10 psig), and reported as gm/cm$^2$-sec-mm Hg. The flux of the indicated solutions of sodium chloride, urea, creatinine, crystal violet dye and a polyvinyl pyrrolidone of an average molecular weight of 40,000 is reported in Table 2 below.

TABLE II

Block Terpolymer Hollow Fibers
Transport Properties$^a$

| | |
|---|---|
| Dialyzing Area, cm$^2$ | 111.5 |
| Water Flux ($\Delta$ P = 10 psi) g/cm$^2$-sec-mm Hg | 9.45 × 10$^{-5}$ |
| NaCl Flux (3 g/l) g/cm$^2$-sec | 5.55 × 10$^{-7}$ |
| Urea Flux (17.4 g/l) g/cm$^2$-sec | 2.37 × 10$^{-6}$ |
| Creatinine Flux (1.16 g/l) g/cm$^2$-sec | 1.08 × 10$^{-7}$ |
| Crystal Violet Dye (0.5 g/l) | rapid passage: blue color in 45-60 seconds |
| Polyvinyl pyrrolidone ($\overline{M}_w$ 40,000) (23 g/l) | not detected after 10 hours |

$^a$All flux values normalized to a membrane thickness of 25.4 μ.

EXAMPLE III

A. Terpolymer Preparation

A series of six lactam-polyethylene glycolpolyacyl lactam terpolymers were prepared by the polyester initiated anionic polymerization of lactam as outlined above and detailed in U.S. Pat. No. 3,944,629. For these polyester initiated terpolymers there was used ε-caprolactam, from 30 to 60 weight percent of polyethylene glycol of either 1450 or 3000 mol. wt. and dimethyl terephthalate to produce solely ester terminal groups on the terpolymer molecules. In each instance aluminum isopropoxide was employed as the transesterification catalyst and bromo magnesium caprolactam as the Grignard anionic lactam polymerization catalyst. There were also added stabilizing amounts of antioxidants 4,4'-butylidine bis(6-tert. butyl-m-cresol) 0.33 wt. % and triphenyl phosphite 0.08 wt. %. The polymerizations were carried out by charging to a reaction vessel an excess of the amount of ε-caprolactam calculated to supply the indicated weight percent of lactam segments, the antioxidants and the amount of polyethylene glycol to supply the indicated weight percent. The mixture was heated to reflux under a light vacuum and an amount of caprolactam, generally about 5%, and water removed and condensed to insure an anhydrous reaction mixture. Thereafter the contents were cooled to 110°-120° C. and an amount of dimethyl terephthalate sufficient to satisfy the glycol charged was added along with from 0.2 to 0.5 wt. % of aluminum isopropoxide transesterification catalyst. Pressure was reduced in the reaction vessel and the contents heated to reflux at about 120° C. Bromomagnesium caprolactam (3 mol. %) in solution in caprolactam was added and refluxing continued to 140° C. with removal of methanol formed under reduced pressure. When all the methanol had been removed the reactor pressure was brought to atmospheric with an inert gas, i.e. nitrogen or carbon dioxide, the reactor cooled to 100° C. and the contents cast into uniform pellets.

Membrane films were solvent cast from 20% by wt. solutions in trifluoroethanol which were filtered through a 2 micron Versapore membrane filter and wiped onto glass to produce a layer 5 mils (127 microns) in thickness. The coated plates were air dried; then the films were rewetted with water and transferred first to a polyethylene sheet and then to a Teflon sheet for completion of drying.

B. Transport Properties

The case film membranes formed as described above were tested for transport properties for water, urea (mol. wt.=60) and Vitamin B-12 (mol. wt.=1355) and compared to those for Cuprophane 150, a commercial polyacrylonitrile membrane and an experimental polycarbonate membrane. The results are reported as water permeability $L_P$, permeabilities of each solute, $P_m$, and the ratios of each such permeability to the water permeability of the test membrane. The tests were conducted in standard test dialysis cells at 37° C. and from saline solution using standard procedures specified by the National Institutes for Health. For details of such procedures see E. F. Leonard et al, Evaluation of Membranes for Hemodialyzers, Dept. of HEW Publication No. (NIH) 74-605, U.S. Govt. Printing Office (1974). The results are set out in Table 3 below.

TABLE 3

Summary of Data for Terpolymer Membranes

| Sample # | Terpolymer Composition | Thickness* (microns) | $L_p \times 10^{-5}$ (cm/sec atm) | Urea $P_m \times 10^4$ (cm/sec) | B-12 $P_m \times 10^{-4}$ (cm/sec) | Ratio $P_mL_p$ Urea | B-12 |
|---|---|---|---|---|---|---|---|
| A | 30% PEG 1450 | 33 ± 3 | 0.56 | 6.67 | 0.313 | 11.9 | 0.56 |
| B | 40% PEG 1450 | 23 ± 1 | 0.54 | 4.78 | 0.253 | 8.85 | 0.47 |
| C | 30% PEG 3000 | 34 ± 11 | 0.81 | 6.23 | 0.401 | 7.69 | 0.49 |
| D | 40% PEG 3000 | 23 ± 2 | 1.6 | 7.02 | 0.442 | 4.47 | 0.28 |
| E | 50% PEG 3000 | 20 ± 5 | 2.8 | 13.9 | 1.45 | 5.02 | 0.52 |
| F | 60% PEG 3000 | 46 ± 6 | 1.9 | 10.4 | 1.04 | 5.36 | 0.54 |
| Cuprophane 150 PM[1] | | 23 ± 0.2 | 3.4 | 9.34 | 0.405 | 2.74 | 0.12 |
| Rhone-Poulenc[2] | | 31 ± 1 | 64.1 | 13.2 | 2.35 | 0.21 | 0.04 |
| Polycarbonate[3] | | 34 ± 2 | 8.1 | 11.6 | 1.80 | 1.43 | 0.22 |

[1]Commercial cellulose membrane manufactured by Enka Glanzstoff AG.
[2]Commercial polyacrylonitrile membrane by Rhone-Poulenc.
[3]Experimental membrane.
*Thickness was measured on samples tested for $L_p$.

Samples E and F above were also retested for permeability after exposure to human blood plasma for a period sufficient to absorb plasma proteins. The terpolymer samples demonstrated an increase in water permeability of about 25 to 30% after such exposure. Because of different thickness in the samples tested in the solutes an apparent decrease in solute permeabilities was not confirmed. When diffusivities to each solute were determined from the observed permeabilities and the thicknesses measured after testing by multiplying the thickness by the respective permeability no significant differences for either urea or Vitamin B-12 was found. The diffusivities determined as indicated are set out in Table 4 below.

TABLE 4

| Sample | Before Plasma D × $10^5$cm$^2$/sec | After Plasma D × $10^5$cm$^2$/sec |
|---|---|---|
| E (urea) | 0.28 | 0.35 |
| E (B-12) | 0.029 | 0.026 |
| F (urea) | 0.48 | 0.45 |
| F (B-12) | 0.048 | 0.056 |

EXAMPLE IV

The terpolymer of sample E of Example III, i.e. a polyester initiated, ester group terminated polymer of 50 wt.% polyethylene glycol segments of approximately 3000 mol. weight and 50% polycaprolactam units, was formed into a hollow fiber membrane and tested for its transport properties.

A. Membrane Formation

The terpolymer of sample E described above was melt spun through a tube in orifice spinneret at 270° C. into air and then into a quenching bath of acetone. Nitrogen was injected into the bore of the forming filament to maintain its form until solidified. The hollow filaments were taken up on a bobbin at a speed of 127 cm/sec. (250 ft/min.), washed with water and dried. The dimensions of the dried fibers and upon rewetting by soaking in water and the percent change in these dimensions as determined by a Leitz Optical Microscope are set out in Table 5 below.

TABLE 5

| Dimensions and Change in Terpolymer Fiber | | |
|---|---|---|
| Dimensions (microns) | | % Change |
| Dry | Wet | on Wetting |
| ID 134 ± 30 | 178 ± 21 | 33 |
| OD 179 ± 31 | 229 ± 20 | 28 |
| Wall 22 ± 8 | 26 ± 10 | 18 |
| Length - fibers originally 15 cm. | | 10 |

Bundles of 200 fibers of 15 cm. exposed length were assembled and potted after soaking the fibers in a 30% glycerine/water solution and drying at ambient conditions to avoid stress failure. The bundles were looped and potted in a low moisture sensitive polyurethane resin. Potting failures were thus avoided. Two fiber bundles prior to potting were subjected to steam autoclaving for a 20 minute cycle at 170° C. These bundles were then potted in the same way and all bundles submitted to transport property tests.

B. Transport Properties

Samples of the potted hollow fiber bundles prepared as described above were subjected to tests for transport of water and of various molecular size solutes using standard methods and procedures for such tests as reported by Klein, Holland, Lebouf, Donnaud and Smith in "Transport and Mechanical Properties of Hemodialysis Hollow Fibers", *Journal of Membrane Science* Vol. 1, No. 4 (1976). All tests were conducted at 37° C. in standard test cells. The data reported in Table 6 below is the mean of three bundles tested and is stated both as permeability ($P_m \times 10^4$ cm/sec) and resistance ($R_M$ min/cm). The water permeability ($L_P$) or ultrafiltration rate of the fibers was determined as $1.51 \times 10^{-5}$ ml/cm$^2$-sec-atm.

TABLE 6

| | Permeability Data (37° C.) | | |
|---|---|---|---|
| Solute | Solute Molecular Wgt. | $P_M \times 10^4$ (cm/sec) | $R_M$(min/cm) |
| Urea | 60.1 | 6.38 | 26.3 |
| Creatinine | 113.1 | 3.28 | 51.0 |
| Phosphate(HP$_4$=) | 96 | 0.59 | 293 |
| Histidine | 155.2 | 1.37 | 122 |
| Tryptohpan | 204.2 | 4.07 | 40.9 |
| Sucrose | 342.3 | 1.37 | 123 |
| Raffinose | 504.5 | 0.45 | 394 |
| Vitamin B-12 | 1355 | 0.31 | 531 |
| Inulin | 5200 | 0.027 | 6300 |

The average permeabilities for seven solutes of the two previously steam autoclaved fibers bundles was determined in the same manner. A comparison of these average permeabilities with those reported in Table 6 above clearly establishes that the fibers can be steam sterilized and such autoclaving has no effect on the permeabilities of the solutes from saline solution. The data are set out in Table 7 below.

TABLE 7

| EFFECT OF STEAM AUTOCLAVING ON FIBER SOLUTE PERMEABILITY | | |
|---|---|---|
| | $P_M \times 10^4$(cm/sec) | |
| Solute | Untreated | Autoclaved |
| Urea | 6.38 | 6.01 |
| Creatinine | 3.28 | 2.69 |
| Phosphate | 0.59 | 0.43 |
| Sucrose | 1.37 | 1.22 |
| Raffinose | 0.45 | 0.31 |
| Vitamin B-12 | 0.31 | 0.29 |
| Inulin | 0.027 | 0.034 |

One of the previously tested fiber bundles was exposed to calf blood serum by perfusion for one hour, then rinsing with saline solution and again determining permeabilities for five solutes. The data set out in Table 8 below shows no substantial change in permeabilities after exposure to blood serum proteins.

TABLE 8

| PERMEABILITY AFTER EXPOSURE TO CALF SERUM | | |
|---|---|---|
| | $P_M \times 10^4$ (cm/sec) | |
| Solute | Before Exposure | After Exposure |
| Urea | 6.07 | 6.11 |
| Creatinine | 3.05 | 2.93 |
| HOP$_4$= | 0.48 | 0.51 |
| Raffinose | 0.37 | 0.40 |
| Vitamin B-12 | 0.35 | 0.22 |

The transport properties of the terpolymer fiber sample was compared to those of two commercial hollow fibers useful for blood dialysis by comparing the ratios of the permeability to each of a series of solutes from saline solution to the water permeability of the fiber, $P_M/L_P$, and the results set forth in Table 9 below. It is apparent that the ratios for the terpolymer fiber generally were higher than those for the cellulosic fibers to which it was compared indicating better permeability to both low and middle molecular weight solutes at lower or equivalent ultrafiltration rates for water.

TABLE 9

| | Comparison of Ratios $P_M/L_P$ | | |
|---|---|---|---|
| | Terpolymer | Dow[1] | Enka B2-AH[2] |
| Thickness ($\mu$) | 26 | 40 | 38 |
| Ultrafiltration Rate ($ml/cm^2$-sec-atm $\times 10^5$) | 1.51 | 2.58 | 5.00 |
| Solute | Mol. Wt. | | |
| Urea | 60 | 42.0 | 25.8 | 16.3 |
| Creatinine | 113 | 21.6 | 14.1 | 9.18 |
| Histidine | 155 | 9.05 | 7.22 | 5.56 |
| $PO_4^=$ | 96 | 3.77 | 7.91 | 5.26 |
| Tryptophan | 204 | 27.0 | 7.62 | 5.5 |
| Sucrose | 342 | 8.97 | 4.71 | 3.78 |
| Raffinose | 504 | 2.80 | — | — |
| Vitamin B-12 | 1355 | 2.07 | 0.99 | 1.05 |
| Inulin | 5200 | 0.175 | 0.145 | 0.178 |

[1]Commercial cellulose acetate hollow fiber membrane manufactured by Dow Chemical Co.
[2]Commercial cellulose hollow fiber membrane manufactured by Enka Glanzstaff AG.

Blood Compatibility

EXAMPLE V

Tests were conducted for compatibility with human and animal blood of several samples of the lactam-polyol-polyacyl lactam terpolymers which demonstrated such compatibility to be acceptable for dialysis use. In one such test there were compared clotting times in minutes of one ml. of fresh venous human blood when exposed to a 30 mm pressed film disc of the test specimen using Cuprophane PT-150 as the control to minimize effects of variations in the donor blood samples. The test is denominated the Lindholm Whole Blood Clotting test and is a modified Lee-White clotting test utilizing a flat film and is described by R. G. Mason in *Biomaterials Medical Devices and Artificial Organs* 1, pp. 131–138 (1973). The results are expressed as "Clotting Index" which is defined as the ratio of test sample clotting time to the average clotting time for several samples of Cuprophane PT-150 which was found in these tests to be 114 minutes. The clotting index of several of the present terpolymers and samples of other polymer films previously suggested for blood dialysis as determined by the above test is reported in Table 10 below. Those terpolymers containing ester terminal groups derived from decyl alcohol or from polyester initiation are indicated. All samples contained 0.5% by weight of an antioxidant, either (A) Flectol H-polymerized 1,2 dihydro-2,2,4-trimethylquinoline, or (B) BHA-butylated hydroxy anisole. In the indicated samples the antioxidant was extracted from the pressed terpolymer film discs by treatment for 48 hours in acetone. All samples were extracted with distilled water for 24 hours and the water exchanged for physiological saline solution and sealed to exclude oxygen prior to testing. Samples A, B, D, E and F below were the same polymers as samples G, E, F, B and A respectively in Table 1 above of corresponding composition. Samples A-H were prepared and pressed into film membranes as described in Example IA and B.

TABLE 10

| | Blood Coagulation Data | | |
|---|---|---|---|
| Polymer and Glycol[1] | Antioxidant[2] | Extracted | Coagulation Index[3] |
| A. 50% Carbowax 6000/ decyl alcohol | A | X | 0.98 |
| B. 45% Pluronic P-75 | A | X | 0.87 |
| C. 50% PEG 3000/ decyl alcohol | B | — | 0.85 |
| D. 50% PEG 3000 | A | X | 0.83 |
| E. 30% PEG 3000 | A | X | 0.68 |
| F. 30% PEG 1000 | A | X | 0.58 |
| G. 30% PEG 3000/ Polyester initiated | A | X | 0.62 |
| H. 50% PPG 2000/decyl alcohol | A | X | 0.70 |
| Controls: | | | |
| Cuprophane PT-150 | | | 1.00 |
| Mylar Polyester | | | 0.70 |
| Silicone Coated Glass | | | 0.57 |
| LD Polyethylene | | | 0.44 |
| Silicone (Silastic 502-5) | | | 0.38 |

[1]PEG = polyethylene glycol of stated molecular weight; Carbowax 6000 = Polyethylene glycol of 7500 mol. wt. (Union Carbide Corp.) Pluronic P-75 = an ethylene-propylene block copolymer of 4100 mol. wt. (BASF Wyandotte Corp.) PPG = polypropylene glycol of stated molecular weight.
[2]A = Flectol H; B = BHA
[3]Ratio of test sample whole blood coagulation time in minutes to that of Cuprophane control (approx. 114 min.)

In a second test samples of terpolymer A were also subjected to the Cleveland Clinic Closed-Cell test which is described in "A Simple In Vitro Screening Test for Blood Compatibility of Materials" by Kambic, Kiraly and Nosé in the *Journal of Biomedical Material Research* 10 (4) pp. 561–70 (1976). In that test two cells, one containing the terpolymer film sample and one a silicone film control (Silastic 502 of Dow Corning Corp.) are opened at intervals during the two hour test to the direct flow of venous blood from donor dogs and clot weight and hemoglobin concentration determined on a diluted sample of the contacting blood. It was found that platelet aggregation and clot formation was less than was observed with the silicone film control and that clots, once formed, did not adhere to the terpolymer film as they did to the silicone film. A platelet count of the blood samples after exposure showed a lower platelet consumption for the terpolymer, i.e. $178 \times 10^3$ as contrasted to $134 \times 10^3$ for the silicone control from an original platet level of $222 \times 10^3$. This data indicated as improved index of thromboresistance for the terpolymer tested over the Silastic silicone film control.

EXAMPLE VI

Samples of pellets of the terpolymer composition of sample E in Table 3, i.e. 50% polyethylene glycol of 3000 mol. wt. prepared by polyester initiation, and prepared in Example IIIA were subjected to toxicity and hemolysis testing. One sample (A) had been exhaustively extracted with water while sample (B) had been extracted with ethanol in a Soxhlet extractor in addition to water to remove any of the antioxidants present. Both samples were found to exhibit no significant toxicity and 0% hemolysis of whole rabbit blood. These tests further indicated lack of toxicity and blood compatibility of the terpolymer.

EXAMPLE VII

Samples of several of the same terpolymers prepared in Example IA and designated by the same letters were melt spun into filaments by conventional melt spinning procedures utilizing air quenching and the physical properties of the as-spun filaments prior to any orientation by drawing were determined at 65% relative humidity. The tensile strength, elongation to break, and tensile modulus of each test filament was determined and is compared to a sample of as-spun nylon 66 melt spun filament in Table 11 below.

TABLE 11

Physical Properties at 65% RH

| Sample Composition | Ten. (g/den.) | Elong. (%) | Modulus (g/den) |
|---|---|---|---|
| A 30% PEG 1000 | 2.4 | 281 | 2.7 |
| B 30% PEG 3000 | 1.4 | 390 | 1.9 |
| C 30% Carbowax 6000 | 0.56 | 491 | 2.3 |
| F 50% PEG 3000 | 2.1 | 145 | 2.0 |
| Nylon 66 | 2.1 | 376 | 4.1 |

Samples of the above terpolymers when exhaustively extracted continuously with boiling water for periods of a week demonstrate negligible loss of weight, i.e. less than 5%, and no significant change in physical properties. The extracted materials are determined to consist predominantly of antioxidant additives and unpolymerized and low molecular weight polymers only. Thus the stability to long term exposure to high temperature wet treatment is further demonstrated.

What is claimed is:

1. A permselective membrane comprising a caprolactam-polyalkylene ether-polyacyl lactam block terpolymer of at least about 10 microns in thickness and having from 35 to 75% by weight polycaprolactam blocks and from 25 to 65 percent polyalkylene ether blocks.

2. The membrane of claim 1 wherein the said block terpolymer has from 40 to 70 percent by weight polycaprolactam blocks and from 30 to 60 percent by weight polyalkylene ether blocks.

3. A sterilizable permselective membrane comprising a caprolactam-polyalkylene ether-polyacyl lactam block terpolymer of from about 10 to about 1000 microns in thickness and having from 35 to 75 percent by weight polycaprolactam blocks and from 25 to 65 percent by weight polyalkylene ether blocks.

4. The membrane of claim 1 wherein the said block terpolymer is amide group terminated and produced by anionic base-catalyzed polymerization of caprolactam, a polyalkylene glycol and an alkylene or phenylene carbonyl bis-caprolactam.

5. The membrane of claim 1 wherein the said block terpolymer is at least partially ester group terminated and produced by anionic base-catalyzed polymerization of caprolactam, a polyalkylene glycol, an alkylene or phenylene carbonyl bis-caprolactam and a monohydric aliphatic alcohol.

6. The membrane of claim 1 wherein the said block terpolymer is ester group terminated and produced by anionic base-catalyzed polymerization of caprolactam in the presence of a polyether-polyester prepolymer formed by transesterification of a polyalkylene glycol with a di-loweralkyl dicarboxylic acid ester.

7. The membrane of claim 4 wherein the polyalkylene glycol is polyethylene glycol of from about 500 to about 10,000 number average molecular weight.

8. The membrane of claim 5 wherein the polyalkylene glycol is polyethylene glycol of from about 500 to about 10,000 number average molecular weight.

9. The membrane of claim 5 wherein the monohydric aliphatic alcohol is an end-terminated monohydric aliphatic alcohol of from 4 to 12 carbon atoms.

10. The membrane of claim 6 wherein the said prepolymer is formed by transesterification of a polyethylene glycol of from about 500 to about 10,000 number average molecular weight and a di-loweralkyl dicarboxylic acid ester.

11. The membrane of claim 6 wherein the said di-loweralkyl dicarboxylic acid ester is dimethylterephthalate.

12. The membrane of claim 1 in the form of a planar film.

13. The membrane of claim 1 in the form of a hollow fiber.

14. The planar membrane of claim 12 of from about 20 to 1000 microns in thickness.

15. The planar membrane of claim 12 of from about 20 to 50 microns in thickness.

16. The hollow fiber membrane of claim 13 having a wall thickness of from about 15 to 200 microns and an internal diameter of from about 50 to 300 microns.

17. The hollow fiber membrane of claim 13 having a wall thickness of from about 20 to 100 microns and an internal diameter of from about 100 to 200 microns.

* * * * *